United States Patent
Sebastian et al.

(10) Patent No.: US 8,045,444 B2
(45) Date of Patent: Oct. 25, 2011

(54) METHOD OF CONTROLLING MOVEMENTS OF A POSITION OF A MICROSCANNER

(75) Inventors: Abu Sebastian, Adliswil (CH); Angeliki Pantazi, Thalwil (CH); Charalampos Pozidis, Thalwil (CH); Evangelos S. Eleftheriou, Rueschlikon (CH); Reza Moheimani, Maryland (AU)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 12/237,925

(22) Filed: Sep. 25, 2008

(65) Prior Publication Data

US 2009/0080107 A1    Mar. 26, 2009

(51) Int. Cl.
    *G11B 9/00*    (2006.01)
(52) U.S. Cl. ........................................ 369/126; 977/947
(58) Field of Classification Search .................. None
    See application file for complete search history.

(56) References Cited

U.S. PATENT DOCUMENTS

| | | | | |
|---|---|---|---|---|
| 4,358,842 A | * | 11/1982 | Kimura | 369/233 |
| 4,687,962 A | * | 8/1987 | Elbert | 310/316.01 |
| 5,184,055 A | * | 2/1993 | Ohishi et al. | 318/615 |
| 5,307,311 A | * | 4/1994 | Sliwa, Jr. | 365/174 |
| 5,428,489 A | * | 6/1995 | Takamure et al. | 360/244.2 |
| 6,721,918 B2 | | 4/2004 | Self et al. | |
| 7,391,707 B2 | * | 6/2008 | Rust et al. | 369/126 |
| 2001/0013838 A1 | | 8/2001 | Shin et al. | |
| 2006/0285256 A1 | * | 12/2006 | Hirano et al. | 360/294.3 |
| 2007/0229324 A1 | | 10/2007 | Visalli et al. | |
| 2009/0080107 A1 | * | 3/2009 | Sebastian et al. | 360/75 |

OTHER PUBLICATIONS

Abu Sebastian, et al., Achieving Subnanometer Precision in a MEMS-Based Storage Device During Self-Servo Write Process, IEEE Transactions on Nanotechnology, Sep. 2008, pp. 586-595, vol. 7, No. 5, Published in: US.
Lin Xie, et al., Partitioned Bus Coding for Energy Reduction, Jan. 18, 2005, pp. 1280-1283, vol. 2, Publisher: Design Automation Conference, 2005, Proceedings of the ASP-DAC 2005, Asia and South Pacific.

* cited by examiner

*Primary Examiner* — Peter Vincent Agustin
(74) *Attorney, Agent, or Firm* — Suiter Swantz pc llo (57) ABSTRACT

The invention relates to a method of controlling movements of a positioner of a micro-scanner, the method comprising: determining the vibration resonance frequency ranges of the positioner, and performing a main scan by a controlled movement of the positioner.

29 Claims, 5 Drawing Sheets

METHOD OF CONTROLLING MOVEMENTS OF A POSITION OF A MICROSCANNER

CROSS-REFERENCE TO RELATED APPLICATIONS

The present application claims the benefit under 35 U.S.C. §119 of EPO Application Serial No. 07117196.1, filed Sep. 25, 2007 entitled "METHOD OF CONTROLLING MOVEMENTS OF A POSITION OF MICROSCANNER," which is incorporated herein by reference.

TECHNICAL FIELD

The present invention relates to a method of controlling movements of a positioner of a micro-scanner, a controller, a micro-scanner, a data storage device, a scanning probe microscope and a computer program product.

BACKGROUND

Over the past decade, storage densities in magnetic recording technology haves experienced a tremendous increased in storage densities with a corresponding decrease in and the cost per GByte has correspondingly decreased. However, due to limitations imposed by the super-paramagnetic effect, the maximum achievable storage capacity of magnetic recording technologies is believed to be in the order of 250 Gbit/in$^2$.

Another shortcoming of hard disk drives is their high access time. The large physical size of hard disk drives is a major contributor to this high access time. MEMS-based scanning-probe data storage technology is considered as an ultra-high-density and low-access-time alternative to conventional magnetic data storage that addresses some of the shortcomings of the latter. Such a probe-storage device uses nanometer-sharp tips, typically used in scanning probe microscopes to write information to and read the recorded information from a storage medium. Such a probe-storage concept is, for example, disclosed in H. J. Mamin, R. P. Ried, B. D. Terris, and D. Rugar, "High-Density Data Storage Based On The Atomic Force Microscope," Proc. IEEE, vol. 87, pp. 1014-1027, 1999. Such a technology can be regarded as a candidate to previously-proposed technologies for achieving higher storage densities at lower access times. A major challenge in creating a viable probe-storage device is that such probes operate for read and write operations, respectively, at best on the microsecond timescale. Therefore, in order to be competitive with known conventional storage technologies, orders of magnitude increases in speed are necessary is desirable for such a device. One solution to achieve such a substantial increase in data rates is to employ with MEMS-based arrays of probes operating in parallel, with each probe performing read/write/erase operations on an individual storage field. In such a system, a MEMS-based micro-scanner with two-dimensional motion capabilities is used to position the storage medium with respect to the array of read/write probes. Since actuation distances typically are of the order of 100 μm and the moving components have relatively smaller masses, the access delays are generally expected to be smaller than in reduced compared to disk drives.

Implementations of probe-based storage devices are known for example from P. Vettiger, G. Cross, M. Despont, U. Drechsler, U. Duürig, B. Gotsmann, W. Häberle, M. Lantz, H. Rothuizen, R. Stutz, and G. Binnig, "The "Millipede"— Nanotechnology Entering Data Storage," IEEE Transactions on Nanotechnology, Vol. 1, pp. 39-55, 2002 and E. Eleftheriou, T. Antonakopoulos, G. K. Binnig, G. Cherubini, M. Despont, A. Dholakia, U. Durig, M. A. Lantz, H. Pozidis, H. E. Rothuizen, and P. Vettiger, "Millipede—A MEMS Based Scanning-Probe Data Storage System," IEEE Transactions On Magnetics, vol. 39(2), pp. 938-945, 2003.

Such devices are based on a thermo-mechanical principle for storing and retrieving information written on thin polymer films. Thereby, such films typically have a thickness less than 200 nm. Digital information is stored by making indentations on the thin polymer film by using the tips of AFM microcantilevers, which are a few nanometers in diameter. The shape of a typical indentation resembles an almost conical structure with a diameter of approximately 15 to 30 nm. This indentation shape results in an error-rate performance that increasingly rapidly deteriorates as the probe-tip distance from the center of the indentation is increased. This is, for example, discussed H. Pozidis, W. Häberle, D. W. Wiesmann, U. Drechsler, M. Despont, T. Albrecht, and E. Eleftheriou, "Demonstration of Thermomechanical Recording at 641 Gbit/in$^2$," IEEE Transactions On Magnetics, vol. 40(4), pp. 2531-2536, 2004.

Hence accurate positioning of the storage medium relative to the probes is essential. Typically a micro-scanner is employed to position the storage medium. Such a micro-scanner is disclosed in M. A. Lantz, H. Rothuizen, U. Drechsler, W. Haeberle and M. Despont, "A vibration resistant Nanopositioner For Mobile Parallel-Probe Storage Applications", Journal of Microelectromechanical Systems, 2006.

For controlling the micro-scanner in a closed-loop fashion, position information is derived from a global position sensor like a thermal position sensor that is disclosed in M. A. Lantz, G. K. Binnig, M. Despont, and U. Drechsler, "A Micromechanical Thermal Displacement Sensor With Nanometer Resolution," Nanotechnology, Vol. 16, pp. 1089-1094, May 2005.

Track seeking and track following controllers may, for example, utilize thermal sensors. For example A. Pantazi, A. Sebastian, G. Cherubini, M. Lantz, H. Rothuizen, H. Pozidis, and E. Eleftheriou, "Control of Mems-based Probe Storage Devices," IEEE Transactions on Control System Technology, 2006, discloses a prototype system that uses thermal position sensors for deriving positional information.

Thermal sensors have a satisfactory noise performance at increased high frequencies. However, they tend to suffer from significant low-frequency drifts which can be considered as low-frequency noise. Hence a feedback-control scheme relying on the thermal sensors alone is not suitable for a long-term operation of the device. Because of the availability of multiple probes, a small number of probes and their respective storage fields could be dedicated for the generation of some form of medium-derived positional error signal (PES). This medium-derived PES accurately captures deviations from the track centerline for each data track. Therefore, it has a very limited range that is substantially equal to the distance between tracks.

Nevertheless, since medium-derived PES is crucial for a satisfactory operation of such a micro-scanner, prior to using a MEMS-based scanning probe storage device, the servo information generating the medium-derived PES has to be written in those storage fields reserved for this specific purpose. This operation is referred to as "servo writing". Since the servo information is written without assistance from an external positioning device, the servo writing is usually called "self servo writing".

An object of the present invention is to provide an improved method of controlling movements of a positioner of a scanner, an improved controller, an improved scanner, an improved data storage device and an improved scanning probe microscope.

SUMMARY

According to an embodiment of the present invention, there is provided a method of controlling at least a movement of a positioner of a scanner, the method being performed in a controlled substantially vibration free environment, the method comprising determining a first and second vibration resonance frequency range of the positioner, wherein the first and second ranges comprise a first and a second vibration resonance of the positioner, respectively, and performing a main scan by a movement of the positioner in the first and second scan direction, wherein the spatial positioning of the positioner in the first and second scan direction is controlled by a first and second feedback loop, respectively, wherein the controlling by the first and second feedback loop is essentially performed in the first and second resonance frequency range, respectively.

The method according to the invention has two main advantages. One advantage offered by an embodiment of the present invention is a damping of the first resonance mode of the scanner. The second, a further advantage, is that by employing the method according to the invention it may be possible to further reduce the effect of sensor drifts and other low-frequency noise. The reason therefore is this may be attributed to the fact that, typically, the first resonant mode of the scanner is located in a frequency range above the frequency range where sensor drifts and other low-frequency noise disturbances are present. Since the controlling of the feedback loops is essentially performed in the frequency range, which comprises the resonant modes of the scanner, the system is sensitive to sensing noise only substantially in the frequency regions of the resonant modes where control over the dynamics is desirably essential. In other words, the controlling of the first and second feedback loop is performed employing a controller that is active essentially only in the frequency range which comprises the resonant modes. In this way, high-servo writing speeds may be achieved and this may be done while substantially reducing the effect while ensuring that sensor drifts will have a minimal effect on the generated servo pattern.

In accordance with an embodiment of the invention, the method further comprises acquiring a first and second vibration frequency response of the positioner in a first and second scan direction, respectively, wherein the determination of the first and second resonance frequency range of the positioner is being performed using the first and second vibration frequency response, respectively.

In accordance with an embodiment of the invention, the method further comprises performing an auxiliary scan, wherein the auxiliary scan corresponds to performing the main scan for a preset spatial position of the positioner (108) in the second scan direction (118). In detail, the method further comprises performing an auxiliary scan by a movement of the positioner in the first scan direction for a preset spatial position of the positioner in the second scan direction, wherein the spatial positioning of the positioner in the first scan direction is controlled by the first feedback loop, wherein the controlling by the first feedback loop is essentially performed in the first resonance frequency range, wherein the spatial positioning of the positioner in the second scan direction is controlled by the second feedback loop, wherein the controlling by the second feedback loop is essentially performed in the second resonance frequency range.

In accordance with an embodiment of the invention, the method further comprises acquiring a deviation of the positioner in the second scan direction from the preset spatial position, the deviation resulting from performing the movement of the positioner in the first scan direction.

In accordance with an embodiment of the invention, for performing of the main scan the controlling by the second feedback loop further employs a deviation correction in the second scan direction, wherein the deviation correction is performed using the acquired deviation.

The reason for performing an auxiliary scan, as well as a main scan, is a cross coupling resulting from the scanning in the first scan direction. A controller active essentially in the frequency range which is comprised of the resonant modes is not able to reduce the effect of cross-coupling. In general, reducing the effects of cross-coupling and measurement noise simultaneously over a given frequency bandwidth is difficult since these two objectives are contradictory. For this reason, a two-stage approach is used wherein in the auxiliary scan the deviation of the positioner in the second scan direction from the preset spatial position is acquired which allows identification of the effect of cross coupling in the second scan direction. This information is then used in the main scan by performing a deviation correction using the acquired deviation and thus removing and/or substantially reducing the cross coupling during the main scan.

In accordance with an embodiment of the invention, the position of the positioner is acquired using a position sensor. The method further comprises acquiring a first spectral noise of the position sensor in the first scan direction, acquiring a second spectral noise of the position sensor in the second scan direction, and determining a first and a second noise spectral characteristic, wherein the first and second noise spectral characteristics are modeling the acquired first and second spectral noise behavior of the position sensor, wherein for performing the auxiliary scan and the main scan the controlling of the first feedback loop further comprises using the first sensor noise spectral characteristic and the controlling of the second feedback loop further comprises using the second sensor noise spectral characteristic.

This allows reaching the goal to damp resonance modes of the scanner simultaneously with reducing the effect of sensor drifts and other low-frequency noise even in case the noise characteristics of the system is overlaid in a complicated way to the vibration frequency response of the system.

In accordance with an embodiment of the invention, the method further comprises determining a first and second vibration transfer function, wherein the first and second vibration transfer function are modeling the acquired first and second vibration frequency responses, wherein the determination of the first and second resonance frequency ranges are performed using said first and second vibration transfer function. The method further comprises determining a deviation function, wherein the deviation function is modeling the acquired deviation, wherein the deviation correction is performed using the deviation function.

Using the deviation function and/or the vibration transfer function has the advantage that the controller comprising the feedback loop can be designed in a technically simple way since less complicated mathematical methods can be used in order to directly analyze the vibration transfer functions and/or deviation function in order to extract parameters which are necessary in order for controlling the operation of the feedback loop.

In accordance with an embodiment of the invention, the controlling of the first and second feedback loop is performed employing a controller that is active essentially in the first and/or second resonance frequency ranges. Such a controller can be designed in a number of ways. In general it is possible to minimize a cost function, such as $H_2$ or $H_\infty$ norm of the closed-loop transfer functions. Using a minimization of a cost function in order to design such a controller has the advantage that the vibration frequency response of the scanner can have any arbitrary structure as well as the spectral noise behavior of the sensor can have any arbitrary structure. However, a much simpler design and preferred embodiment of such a controller design is given by a resonant controller that damps the resonances of the scanner.

Such a resonant controller does not utilize or require a higher bandwidth than the system which is being controlled and may guarantee closed loop stability in the presence of out-of-bandwidth dynamics. Further, such a resonant controller can be applied to multimode MIMO-systems with collocated sensors and actuators.

In accordance with an embodiment of the invention, the auxiliary scan and the main scan by the movement of the positioner are performed in a controlled substantially vibration free environment. By performing the auxiliary scan and the main scan in a controlled substantially vibration free environment, low-frequency input disturbances, e.g. vibrations, will not distort the scanner's position. In general, the controller is very sensitive to input and output disturbances. In particular, low- and high-frequency output disturbances directly affect the position of the scanner. The effect of such disturbances at and close to the resonance frequency of the scanner is significantly reduced by the damping imposed by the controller. Also, the feedback loop is reasonably immune to high-frequency input disturbances. Therefore, it has to be ensured that the low-frequency range of input disturbances is shielded from the scanner during the auxiliary scan and the main scan which can be performed by the substantially vibration free environment.

In accordance with an embodiment of the invention, the main scan comprises writing of servo patterns to a substrate, wherein the servo patterns are written employing the positioner. Such pre-written servo patterns provide an alternate position signal which measures the deviation of, for example, a micro-cantilever tip from a track center during a read operation of a respective storage device. Thereby, the method to generate the medium derived PES is based on the concept of mutually vertically displaced sequences of indentations, (bursts,) arranged in such a way as to produce two signals in quadrate, which can be combined to provide a robust PES.

In accordance with an embodiment of the invention, the servo patterns are written using indentations. Thereby, the presence or absence of indentations corresponds to logical '1's or '0's respectively. Using the concept of writing servo patterns using indentations allows development of MEMS-based data storage devices with extremely high storage densities while reducing read or write errors by miss positioning of scanner probes to a minimum.

In accordance with an embodiment of the invention, for a further preset spatial position the method comprises performing a further auxiliary scan, acquiring a further deviation of the positioner in the second scan direction from the further preset spatial position, performing a further main scan by a movement of the positioner, wherein the controlling by the second feedback loop is essentially performed in the second frequency range, wherein the controlling by the second feedback loop employs a deviation correction, wherein the deviation correction is performed using the further acquired deviation. In other words, the procedure of performing the auxiliary scan and the main scan is repeated for every preset spatial position. In case the procedure is combined with writing servo patterns, for example, for usage in a storage device, the above mentioned procedure is repeated for all the tracks over which the servo fields are written.

In another aspect, an embodiment of the invention relates to a controller, the controller being adapted for controlling movements of a positioner of a scanner.

In another aspect, an embodiment of the invention relates to a scanner, the scanner comprising a positioner and a controller according to the invention. Thereby, the positioner of the scanner further comprises a probe or a substrate. The positioner is adapted to either move the probe relative to the substrate or to move the substrate relative to the probe. The probe is adapted for writing of servo patterns to the substrate, wherein the servo patterns are indentations.

In another aspect, an embodiment of the invention relates to a data storage device, the data storage device comprising a scanner according to the invention.

In yet another aspect, an embodiment of the invention relates to a scanning probe microscope, the scanning probe microscope comprising a scanner according to the invention. Of course, for usage in a scanning probe microscope the feature of writing servo patterns to a substrate is not necessary. Nevertheless, a highly increased accuracy in the positioning of the probe with respect to a substrate to be investigated can be achieved by employing the method of controlling movements of the positioner of the scanner according to the invention. Sensor drifts and cross couplings are reduced to a minimum and resonant nodes of the scanner are efficiently damped.

In another aspect, an embodiment of the invention relates to a computer program product comprising computer executable instructions for performing the method of controlling movements of a positioner of a scanner according to the invention.

BRIEF DESCRIPTION OF THE DRAWINGS

In the following, embodiments of the invention will be described in greater detail by way of example only making reference to the drawings in which.

DETAILED DESCRIPTION OF THE INVENTION

Figure 1:
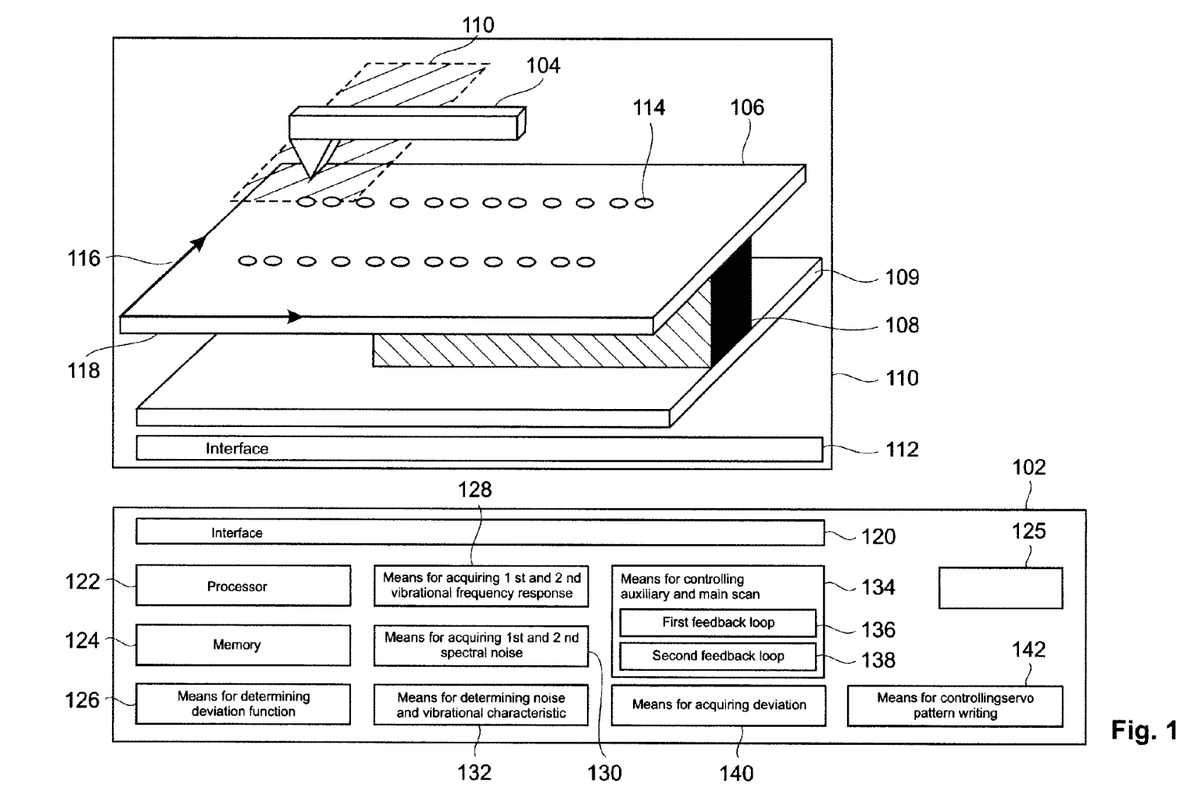
FIG. 1 is a block diagram of a micro-scanner comprising a controller according to the invention.

FIG. 1 is a block diagram of a micro-scanner 100 comprising a controller 102. The micro-scanner 100 comprises a positioner 108, which is mounted on a support 109. In the present example of FIG. 1 the positioner carries a substrate 106 which can be moved relative to the support 109 and therewith also relative to a probe 104 which is located at a fixed position relative to the support 109. Thereby, the positioner 108 may, for example, comprise coils (not shown here), wherein by applying a current to said coils a force is generated which induces a displacement of the substrate 106 via the positioner 108.

In the thermo-mechanical probe-based storage device depicted in FIG. 1, information is stored as sequences of indentations 114 written on the substrate 106 which is a thin polymer film. Even though only one probe 104 is depicted in FIG. 1, typically a two-dimensional array of micro-cantilevers 104 is used. Thereby, the presence or absence of indentations as already mentioned above corresponds to logical '1' or '0', respectively. Each micro-cantilever performs write/read/erase operations in an individual storage field with an area on the order of approximately 100 µm×100 µm. Thermo-mechanical writing is achieved by applying a force through the micro-cantilever/tip 104 to the polymer layer 106 and simultaneously softening the polymer layer 106 by local heating. To read the written information, the micro-cantilever 104 originally used for writing is given the additional function of a thermal read back sensor by exploiting its temperature dependent resistance.

To generate information on the position of the substrate 106 with respect to the probe 104, two pairs of thermal position sensors 110 are used. In the example of FIG. 1 an alternative position signal based on pre-written servo patterns 114 on the substrate 106 is used to obtain information on the micro-scanner's position. Therewith, the storage fields 114 are dedicated for the generation of a medium derived positional error signal (PES).

The thermal position sensors 110, which are only schematically depicted in FIG. 1, are resistive heaters overlapping the substrate 106. In a practical embodiment the thermal position sensors are located on top of the substrate 106 and are part of the cantilever array 104. For further details on how to implement the thermal position sensors together with the substrate and the cantilevers in a micro-scanner, refer to M. A. Lantz, G. K. Binnig, M. Despont, and U. Drechsler, "A Micromechanical Thermal Displacement Sensor With Nanometer resolution," Nanotechnology, Vol. 16, pp. 1089-1094, May 2005.

In this case, as the scanner moves, the overlap between the heaters and the substrate changes. This results in a change in the thermal conduction path and hence the temperature of the heaters. The change in temperature translates to a change in the electrical resistance which is sensed to infer the position of the scan table. The thermal position sensors 110 have a resolution of less than 1 nm in the dynamics range of more than 100 micrometers over a 5 kHz bandwidth.

In the embodiment of FIG. 1 the controller 102 is a resonant controller. The resonant controller communicates with the micro-scanner 100 by an interface 120. For this purpose, the micro-scanner 100 also comprises a corresponding interface 112. The controller 102 further comprises a processor 122 and a memory 124. In the following it is assumed that the controller 102 is used to initially control a self-servo writing process of the micro-scanner 100 in order to allow for increased high accuracy in the writing of the indentations 114 to the substrate 106 by the probe 104.

For this purpose, the means 128 are used to acquire a first vibration frequency response of the combined system of positioner 108 and substrate 106 in the first scan direction 118, as well as to acquire a second vibration frequency response of the combined system of positioner 108 and substrate 106 in a the second scan direction 116.

Using the means 132 a first and second vibration transfer function is determined, wherein the first and second vibration transfer function are modeling the acquired first and second vibration frequency responses. Using the means 125 first and second resonance frequency ranges of the combined system of positioner and substrate 106 are determined, wherein said resonance frequency ranges are determined based on analysis of the determined vibration transfer functions, wherein the resonance frequency ranges comprise vibration resonances of the positioner. In detail, the first resonance frequency range comprises a vibration resonance of the positioner-substrate system with respect to the first scan direction 118 and the second resonance frequency range comprises a further vibration resonance of the positioner-substrate system in the second scan direction 116. Thereby, in case the positioner-substrate system comprises multiple vibration resonances in the first and second scan directions 116 and 118, for each of the vibration resonances a respective resonance frequency range is determined. This results in a set of first resonance frequency ranges of the positioner-substrate system, as well as in a set of second resonance frequency ranges of the positioner-substrate system. The determination of the resonance frequency ranges is being performed by the means 125.

After having performed the determination of the resonance frequency ranges, using the means 134 an auxiliary scan is being performed by the micro-scanner 100 controlled by the controller 102. Thereby, the auxiliary scan is performed by a movement of the substrate 106 in the first scan direction 118. This movement is performed for a preset spatial position of the substrate 106 with respect to the second scan direction 116. The means 134 for controlling the auxiliary scan comprise a first feedback loop 136 and a second feedback loop 138. The first feedback loop 136 uses the determined first resonance frequency range(s) in such a way that the controlling by the first feedback loop is essentially performed in the first resonance frequency range(s). In other words, the first feedback loop does only give a highly sensitive feedback in the frequency regions where 'control over the dynamics' is substantially desirable and essential.

While controlling a dynamics system there are some frequency regions which are rather critical to control. For example, in the case of a micro-scanner these frequency regions are the regions where resonance occurs (eg. >100 Hz and <200 Hz). The controller is active in a range of frequencies right from DC till or beyond these critical frequency regions. However, knowing that the system is already in a vibration free environment, one can afford to limit the control substantially to be confined only to the frequency regions where control is substantially desirable and essential. In this way, the impact of measurement noise may be substantially reduced. This further will also have other benefits like being able to estimate the cross-coupling, since there is substantially no control at DC and very little reduced control at low frequencies (eg. <10 Hz).

These are, of course, the frequency regions which comprise vibration resonances of the positioner-substrate system. Besides the first feedback loop, the second feedback loop 138 is used to control the micro-scanner 100. Similarly to the first feedback loop 136, the second feedback loop 138 is used to control the spatial positioning of the substrate 106 in the second scan direction, wherein the controlling by the second feedback loop 138 is essentially performed in the second resonance frequency range.

However, even by using the first feedback loop 136 and the second feedback loop 138, a cross coupling in the first scan direction 116 resulting due to a movement of the substrate 106 in the second scan direction 118 cannot be avoided completely. For this reason, during the auxiliary scan a deviation of the substrate 106 in the second scan direction 116 from the preset spatial position is acquired by the controller 102 using means 140. Based on the acquired deviation from the preset spatial position in the direction 116, using the means 126 a deviation function is determined. Thereby, the deviation function is modeling the acquired deviation.

Using again with the means 134, the above described procedure of the auxiliary scan is repeated again as a "main scan". However, the difference between the now occurring main scan and the previously carried out auxiliary scan is, that, for the main scan, additionally a correction for the deviation in the second direction 116 is performed using the determined deviation function. For this purpose, the controlling by the second feedback loop 138 further employs a deviation correction in said second direction 116. The result is, that a movement of the substrate 106 relative to the probe 104 can be achieved which is virtually free of cross coupling, which is substantially reduced.

Since outside the resonances, the first and second feedback loops 136 and 138 have limited disturbance rejection capability, they are also significantly immune to sensing noise in these frequency regions (eg. <100 Hz and >200 Hz). In particular, they are immune to sensor drift that occurs typically in the <10 Hz regime. Since outside the resonances the first and second feedback loops 136 and 138 are only tuned to a low sensitivity, disturbances occurring in such frequency regions are not significantly influencing the correcting behavior of the controller 102. In other words, drifts of the micro-scanner 100 which are considered as low-frequency noise are not significantly considered by the controller 102. This means that instead, the controller 102 is trying to correct for noise acquired (accidentally) from the position sensor 110. The controller 102 does not consider such kind of noise therewith, preventing an erroneous repositioning of the substrate 106 due to the noise misinformation.

During the main scan the probe 104 can be used to write the indentations 114 to the substrate 106. This leads to the servo-patterns depicted in FIG. 1. Thereby, the servo-pattern writing is controlled by the means 142.

In the above described embodiment, the spectral noise of the position sensor 110 was not considered explicitly. However, one can also utilize the a priori spectral noise information in the design of the feedback controller. In the above described embodiment the spectral noise of the position sensor 110 was not considered explicitly. However, in case the position sensor 110 shows a strong spectral noise behavior in a frequency range which also comprises a resonance of the positioner, an additional consideration of the spectral noise of the position sensor may be required. For this purpose, the controller 102 further comprises means 130 for acquiring a first spectral noise of the position sensor in the first scan direction and for acquiring a second spectral noise of the position sensor in the second scan direction. Herein, this case has to be mentioned again, that, preferably for the first and second scan direction, different position sensors are used. Using the acquired first and second spectral noise of the position sensor, the means 132 can be used in order to determine a respective first and second noise spectral characteristic, wherein the first and second noise spectral characteristics are modeling the acquired first and second spectral noise behavior of the position sensor. While performing the auxiliary scan and the main scan the controlling of the first feedback loop 136 then further comprises using the first sensor noise spectral characteristic and the controlling of the second feedback Loop 138 further comprises using the second sensor noise spectral characteristic.

Figure 2:
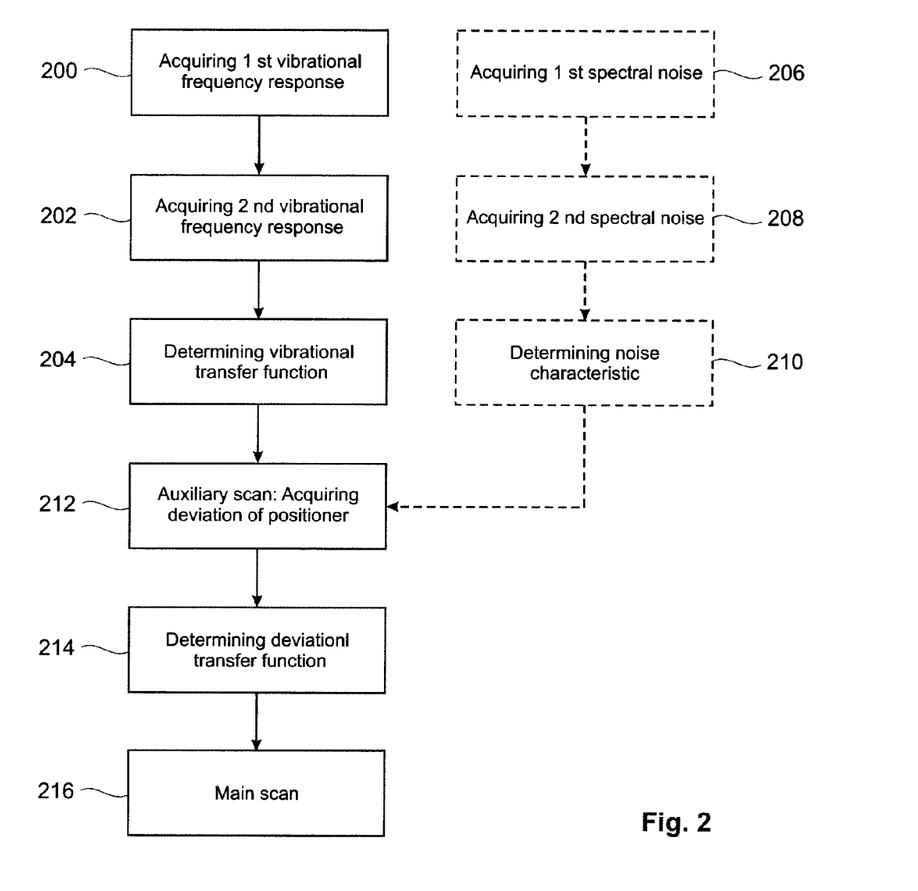
FIG. 2 is a flowchart illustrating the method of controlling movements of a positioner of a micro-scanner.

FIG. 2 is a flowchart illustrating the method of controlling movements of a positioner 108 of a micro-scanner 100. In step 200 a first vibration frequency response of the positioner is acquired in a first scan direction. This is followed by step 202 wherein a second vibration frequency response of the positioner is acquired in a second scan direction. In step 204 a first resonance frequency range of the positioner is determined by means of analyzing a first and second vibration transfer function, wherein the first and second vibration transfer functions are modeling the acquired first and second vibration frequency responses, wherein the determination of the first and second resonance frequency ranges are performed using the first and second vibration transfer function.

After step 204, step 212 is performed which is an auxiliary scan. The auxiliary scan is performed by a movement of the positioner in the first scan direction for the preset spatial position of the positioner in the second scan direction, wherein the spatial positioning of the positioner in the first scan direction is controlled by a first feedback loop, wherein the controlling by the first feedback loop is essentially performed in the first resonance frequency range, wherein the spatial positioning of the positioner in the second scan direction is controlled by a second feedback loop, wherein the controlling by the second feedback loop is essentially performed in the second resonance frequency range. Step 212 is necessary and desirable to perform due to a deviation of the positioner in the second scan direction from the preset spatial position during a scan in the first scan direction. This deviation of the positioner is acquired and a deviation function is determined from this acquired deviation in step 214. In step 216, a main scan is performed which comprises the same steps as the auxiliary scan in step 212 and additionally a correction for the deviation determined in step 214.

Additionally, it is possible to further use the spectral noise of the position sensor for increased accuracy in a more accurate controlling of the movements of the positioner of the micro-scanner. For this purpose, in step 206 a first spectral noise of the position sensor is acquired in the first scan direction. This is followed by step 208 wherein a second spectral noise of the position sensor in the second scan direction is acquired. Based on the acquired first and second spectral noise of the position sensor in step 210 a first and second noise spectral characteristic is determined, wherein the first and second noise spectral characteristic are modeling the acquired first and second spectral noise behavior of the position sensor. This additional information with the determined noise spectral characteristics from step 210 can then be used in steps 212 and 216 for performing the auxiliary and the main scan.

It has to be noted, that the first spectral noise and the second spectral noise are preferably acquired using different position sensors, wherein each position sensor is adapted for acquiring of position signals in one given scan direction.

Figure 3:
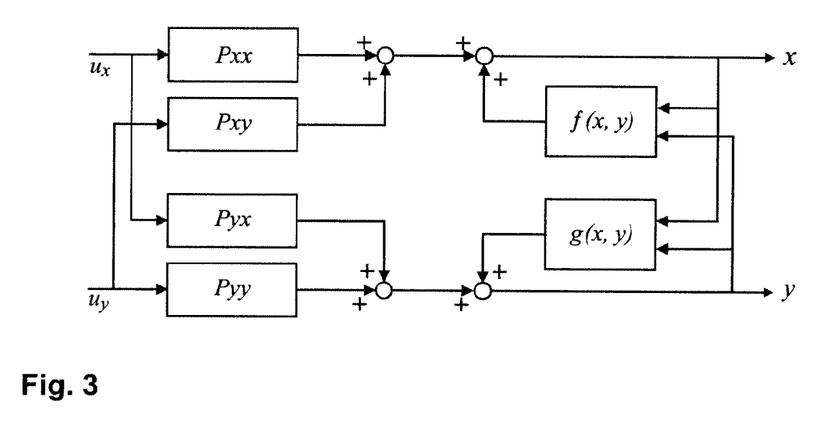
FIG. 3 is a block diagram of a model of a positioner.

FIG. 3 is a block diagram of a model of a positioner 108. The positioner is viewed as a two-input two-output system. The motion of the positioner in each direction is captured by the linear dynamic components, Pxx and Pyy. For example, the transfer function Pxx relates to the coil current ux of an x axis positioner to the respective output displacement x and the transfer function Pyy relates a coil current uy of a positioner responsible for displacements in y-direction to a respective output displacement y. The cross-coupling between the axes is modeled as the sum of the linear dynamic components, Pxy and Pyx with the memory less nonlinear functions of the scanner position x and y, f(x, y) and g(x, y), respectively. Thereby, memory less implies that there is no dynamic component. The cross-coupling depends on the instantaneous values of x and y.

Figure 4:
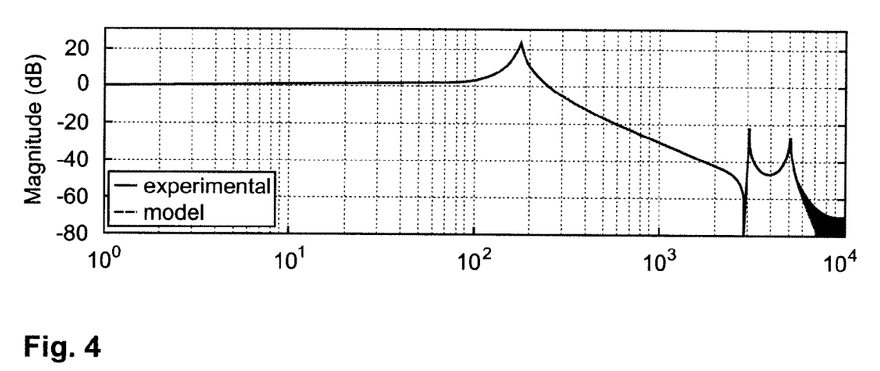
FIG. 4 depicts a frequency response of a positioner motion measured by a position sensor.

As depicted in FIG. 4, in order to identify the transfer functions Pxx and Pyy, the frequency responses of the positioner in the x- and y-directions are obtained using the thermal position sensors over the range from 1 Hz to 10 kHz. As can be seen, the dynamics is dominated by the first resonance mode which can be accurately captured by a simple mass-spring-damper second-order model.

The dynamics of the micro-scanner along x- and y-directions can be modeled using the transfer functions Pxx and Pyy as $$P_{xx}(s) = \frac{\alpha_x \omega_x^2}{s^2 + 2\zeta_x \omega_x s + \omega_x^2} + \Delta_{xx}(s)$$

$$P_{yy}(s) = \frac{\alpha_{yy} \omega_{yy}^2}{s^2 + 2\zeta_{yy} \omega_{yy} s + \omega_{yy}^2} + \Delta_{yy}(s)$$

Thereby, $\alpha$ is a gain. For example, a spring constant or stiffness of the system, $\square$ is a damping and $\omega$ is a resonance frequency. $\Delta xx$ and $\Delta yy$ represent the high-frequency resonances of the micro-scanner, which tend to vary as a function of the micro-scanner's positioner location.

Considering the second order terms in Pxx and Pyy which correspond to the first resonant mode of the micro-scanner along x- and y-directions, i.e. (first and second scan directions), it is clear that both transfer functions represent collocated systems. A number of controller designed methodologies have been developed for high-resonant systems, with collocated sensors and actuators. For example, position feedback control (PPF) and positive position and velocity feedback control (PPVF) were developed as disclosed in J. L. Fanson and T. K. Caughey, "Positive Position Feedback Control For Large Space Structure," in Proc. 28th AIAA/ASME/ASC/AHS Structures Structural Dynamics and Materials Conference, Monterey, Calif., 1987, pp. 588-598, "Positive Position Feedback-Control For Large Space Structures," AIAA Journal, Vol. 28, No. 4, pp. 717-724, April 1990, C. J. Goh and T. K. Caughey, "On The Stability Problem Caused By Finite Actuator Dynamics In The Collocated Control of Large Space Structures," International Journal of Control, Vol. 41, No. 3, pp. 787-802, 1985.

An alternative approach to efficiently damp a collocated system is to use a resonant controller. Resonant controllers have been shown to be very efficient in terms of adding damping to flexible structures with collocated sensors and actuators. Compare for example S. O. R. Moheimani and B. J. G. Vautier, "Resonant Control of Structural Vibration Using Charge-Driven Piezoelectric Actuators," IEEE Transactions on Control Systems Technology, Vol. 13, No. 6, pp. 1021-1035, 2005, H. R. Pota, S. O. R. Moheimani, and M. Smith, "Resonant Controllers For Smart Structures," Smart Materials and Structures, Vol. 11, No. 1, pp. 1-8, 2002, D. Halim and S. O. R. Moheimani, "Spatial Resonant Control of Flexible Structures—Application To A Piezoelectric Laminate Beam," IEEE Transactions on Control Systems Technology, Vol. 9, No. 1, pp. 37-53, January 2001.

Such resonant controllers have a relatively very simple structure, do not require use of a higher bandwidth than the system which is being controlled and can provide guarantee closed-loop stability in the presence of out-of-bandwidth dynamics. Furthermore, they can be applied to multi-mode MIMO-systems with collocated sensors and actuators.

For a single-mode, SISO system, a resonant controller is defined as:

$$K(s) = \frac{\gamma \tilde{\omega}^2 s^2}{s^2 + 2\delta \tilde{\omega} s + \tilde{\omega}^2}$$

Thereby, a resonant controller can be designed in a number of ways. It is possible to have a reduced, minimize a cost function such as H2, or the H∞ norm of the system as a function of controller parameters. This generally results in a nonlinear optimization problem, whose solution can be determined numerically.

Figure 5:
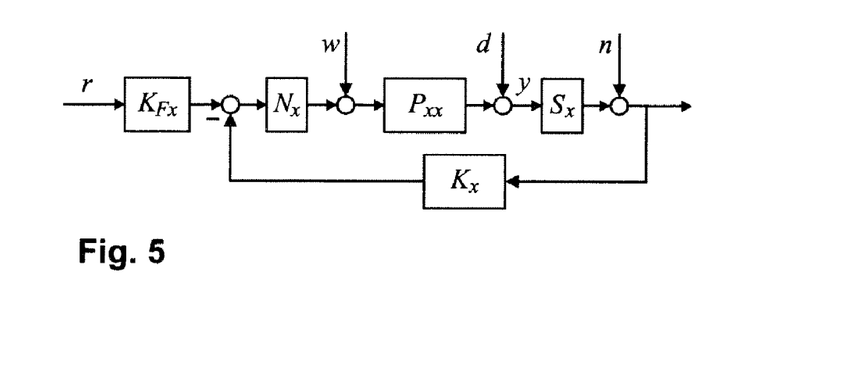
FIG. 5 is a block diagram of a model of a micro-scanner comprising a feedback loop.

FIG. 5 is a block diagram of a model of a micro-scanner comprising a feedback loop for the x-direction. In this Figure, r is the set-point, (a triangular waveform for the x-loop), w represents the input disturbance signals to the system, namely, shocks and vibrations and actuator noise, d represents output disturbance signals and n represents the sensor noise. The position of the micro-scanner in the x-direction is determined via $$y = T_{yr}(s)r + T_{yd}(s)d + T_{yn}(s)n + T_{yx}(s)w$$

where $$T_{yr}(s) = \frac{K_{Fx}(s)N_x(s)P_{xx}(s)}{1 + K_x(s)N_x(s)P_{xx}(s)S_x(s)}$$

$$T_{yn}(s) = \frac{-K_s(s)N_x(s)P_{xx}(s)}{1 + K_x(s)N_x(s)P_{xx}(s)S_x(s)}$$

$$T_{yd}(s) = \frac{1}{1 + K_x(s)N_x(s)P_{xx}(s)S_x(s)}$$

$$T_{yw}(s) = \frac{P_{xx}(s)}{1 + K_x(s)N_x(s)P_{xx}(s)S_x(s)}$$

Here, Nx(s) represents a set of notch filters centered at the out-of-bandwidth resonances of the micro-scanner. These notch filters are incorporated into the feed-forward loop to minimize the effect of the two out-of-bandwidth resonances on the feedback controlled system. Although, the presence of these modes does not result in closed-loop instabilities, they may cause the injection of high-frequency noise into the feedback loop. Inclusion of these notch filters will result in a reduced sensitivity of the closed-loop performance of the system less sensitive to $\Delta x$ and $\Delta y$. The feed forward block, KFx is just a gain equivalent to the inverse of the DC gain of Pxx(s). Furthermore, Sx(s) represents the thermal sensors' low-pass dynamics.

Figure 6:
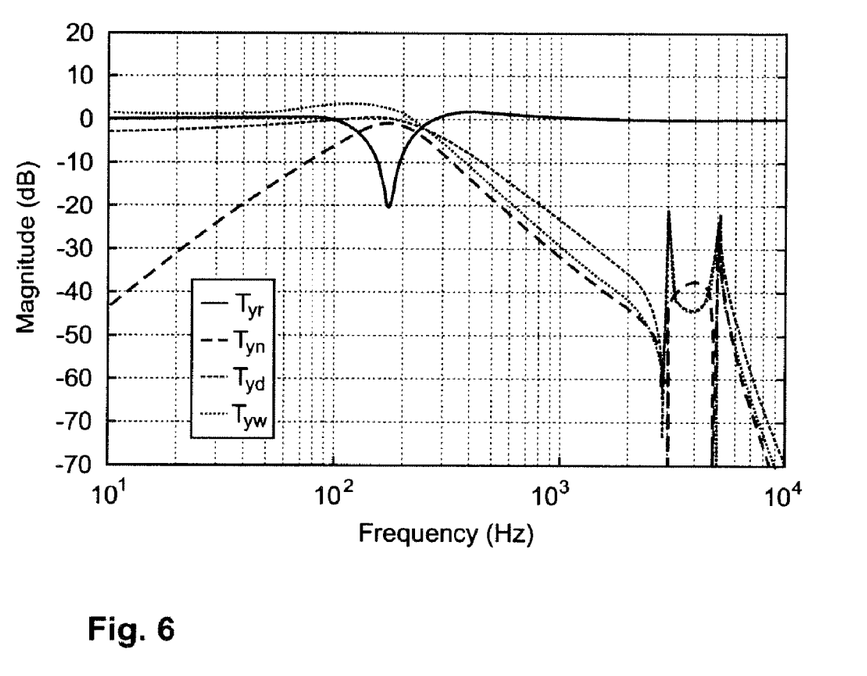
FIG. 6 is a simulation illustrating the spectral behavior of closed loop transfer functions.

FIG. 6 is a simulation illustrating the spectral behavior of the closed-loop transfer functions Tyr(s), Tyn(s), Tyd(s) and Tyw(s). All of the closed-loop transfer functions display a sharp damping at, and close to the resonance frequency of the micro-scanner. This is due to the control action. The noise transfer function, Tyn(s) has a band-pass profile, centered at a first resonance frequency of the micro-scanner with a 40 dB per decade roll off at low- and high-frequency regions. Typically, thermal sensor measurements are particularly noisy at low-frequencies (not shown here). The shape of Tyn(s) ensures that a closed-loop system will not suffer significantly from sensor noise, drift, and other low-frequency noises that the micro-scanner could be subject to. The immunity to drift is particularly important and desirable. This stems from the fact that Kx(s) has a zero at the origin, which substantially reduces the effect of low-frequency sensor noise on the operation of the feedback loop. Furthermore, any high frequency measurement noise is also heavily filtered out. In other words, apart from adding damping to the micro-scanner, the controller reduces the effect of sensor noise on the position of the micro-scanner to an absolute minimum.

As already mentioned above, the controller has increased sensitivity to input and output disturbances. For this reason it is desirable to minimize, further reduce, the input disturbance signal during the self servo writing process. This can be done by performing the self servo writing process in a controlled vibration free environment.

Figure 7:
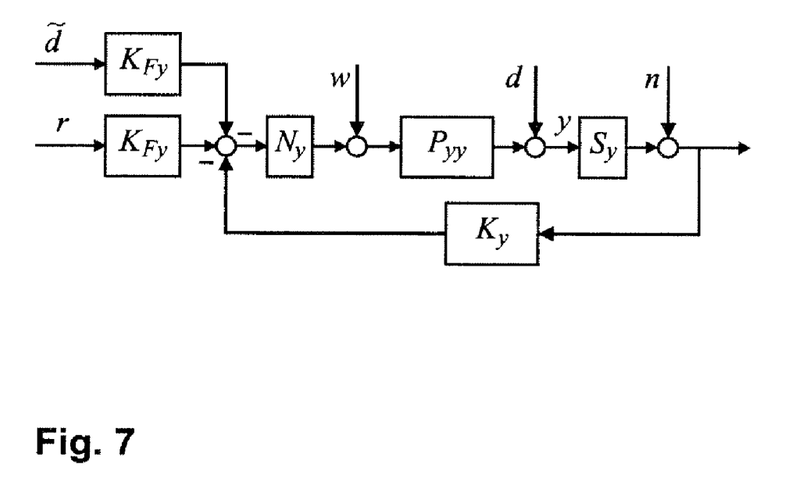
FIG. 7 is a further block diagram of a model of a positioner comprising a feedback loop.

FIG. 7 is a further block diagram of a model of a positioner comprising a feedback loop. Thereby, FIG. 7 depicts the y-axis feedback loop, (i.e. a feedback loop for the second scan direction,) which is very similar to the x-axis feedback loop, (i.e. a feedback loop for the first scan direction,) as depicted in FIG. 5. It contains a resonant controller tuned to ωy and notch filters tuned to the out-of-bandwidth resonant modes of the micro-scanner in the y-axis. Its function, however, is rather different. The reference signal for y-direction, ry is fixed for each period of the triangular signal applied to rx. This is to facilitate the task of self servo writing over a straight line on the storage medium. However, the cross-coupling from x-axis on y-axis during a scan, is quite substantial.

Using the feedback loop for the y-direction as depicted in FIG. 7, the controller damps the first resonant mode of the micro-scanner in the y-axis and shapes the noise transfer function as desired and required. The fact that the controller hardly corrects for output disturbance signals at low-frequencies is now used to reduce the effect of cross-couplings from the axis. Writing of servo field is performed in two stages, namely the auxiliary scan and the main scan. In both stages, the y-axis set point is held constant. First a line is scanned; in the y-axis position as measured by the y-axis thermal sensor is recorded. The recorded information provides an excellent estimate of the cross-coupling signal over the scanning range and consequently the signal d can be determined as $$\hat{d} = \frac{d}{1 + K_y(s)N_y(s)P_{yy}(s)S_y(s)}$$

Clearly this cross-coupling estimate is not free of sensor noise. However, it is safe to assume that a low-frequency noise component of the thermal position sensor signal during the time duration of just one scan may be considered to be insignificant. The same scan is then repeated by applying d as a feed-forward signal, as shown in FIG. 7. For low-frequency scans this strategy results in a reduced minimal residual error. This procedure is then repeated for all the tracks over which the servo fields are to be written. Although this procedure doubles the time needed for completion of the self servo writing process, it results in writing of self-servo fields in a satisfactory manner.

The invention claimed is:

1. A method of controlling at least a movement of a positioner of a scanner, the method being performed in a controlled substantially vibration free environment, the method comprising:
  determining a first and second vibration resonance frequency range of the positioner, wherein the first and second ranges comprise a first and a second vibration resonance of the positioner, respectively; and
  performing a main scan by a movement of the positioner in a first and a second scan direction, wherein the spatial positioning of the positioner in the first and second scan direction is controlled by a first and second feedback loop, respectively, wherein the controlling by the first and second feedback loop is essentially performed in the first and second resonance frequency range, respectively.

2. The method of claim 1, further comprising acquiring a first and second vibration frequency response of the positioner in the first and second scan direction, respectively, wherein the determination of the first and second resonance frequency range of the positioner is being performed using the first and second vibration frequency response, respectively.

3. The method of claim 1, further comprising performing an auxiliary scan, wherein the auxiliary scan corresponds to performing the main scan for a preset spatial position of the positioner in the second scan direction.

4. The method of claim 3, further comprising acquiring a deviation of the positioner in the second scan direction from the preset spatial position, the deviation resulting from performing the movement of the positioner in the first scan direction.

5. The method of claim 4, wherein for performing of the main scan the controlling by the second feedback loop further employs a deviation correction in the second scan direction, wherein the deviation correction is performed using the acquired deviation.

6. The method of claim 1, wherein the position of the positioner is acquired using a position sensor, the method further comprising:
  acquiring a first spectral noise of the position sensor in the first scan direction;
  acquiring a second spectral noise of the position sensor in the second scan direction;
  determining a first and a second noise spectral characteristic, wherein the first and second noise spectral characteristic are modeling the acquired first and second spectral noise behavior of the position sensor; and
  wherein for performing the auxiliary scan and the main scan the controlling of the first feedback loop further comprises using the first sensor noise spectral characteristic and the controlling of the second feedback loop further comprises using the second sensor noise spectral characteristic.

7. The method of claim 6, further comprising:
  determining a first and a second vibration transfer function, wherein the first and second vibration transfer function are modeling the acquired first and second vibration frequency responses, wherein the determination of the first and second resonance frequency ranges are performed using the first and second vibration transfer function; and
  determining a deviation function, wherein the deviation function is modeling the acquired deviation, wherein the deviation correction is performed using the deviation function.

8. The method of claim 1, wherein the controlling of the first and second feedback loop is performed employing a resonant controller.

9. The method of claim 1, wherein the main scan comprises writing of servo patterns to a substrate, wherein the servo patterns are written employing the positioner.

10. The method of claim 9, wherein the servo patterns comprised are written using indentations.

11. The method of claim 10, wherein for a further preset spatial position the method comprises:
  performing a further auxiliary scan;
  acquiring a further deviation of the positioner in the second scan direction from the further preset spatial position; and
  performing a further main scan by a movement of the positioner, wherein the controlling by the second feedback loop is essentially performed in the second frequency range, wherein the controlling by the second feedback loop employs the deviation correction, wherein the deviation correction is performed using the further acquired deviation.

12. A method for controlling at least a movement of a positioner of a scanner in a substantially vibration free environment, the method comprising:
   determining a first vibrational resonance frequency range of the positioner, wherein the first range comprises a first vibrational resonance of the positioner;
   determining a second resonance frequency range of the positioner, wherein the second range comprises a second vibrational resonance of the positioner; and
   controlling a main scan, wherein the main scan is a movement of the positioner in a first and a second scan direction, the main scan is controlled utilizing a first and a second feedback loop, wherein the first feedback loop is adapted to control the spatial positioning of the positioner in the first scan direction essentially in the first frequency range, wherein the spatial positioning of the positioner in the second scan direction is controlled by the second feedback loop, wherein the second feedback loop is adapted to control the spatial positioning of the positioner in the second scan direction essentially in the second frequency range.

13. The method according to claim 12, further comprising acquiring a first and second vibration frequency response of the positioner in a first and second scan direction, respectively, wherein the first and the second resonance frequency range are determined using the first and the second vibration frequency response, respectively.

14. The method according to claim 13, further comprising controlling an auxiliary scan, wherein the control of the auxiliary scan corresponds to the control of the main scan, wherein the auxiliary scan is a movement of the positioner in the first scan direction for a preset spatial position of the positioner in the second scan direction.

15. The method according to claim 14, further comprising acquiring a deviation of the positioner in the second scan direction from the preset spatial position, the deviation resulting from performing the movement of the positioner in the first scan direction.

16. The method according to claim 15, wherein the second feedback loop is further adapted to perform a deviation correction in the second scan direction using the acquired deviation.

17. The method according to claim 16, wherein the scanner comprises a position sensor, the position sensor being adapted for acquiring the position of the positioner, the method further comprising:
   acquiring a first spectral noise of the position sensor in the first scan direction;
   acquiring a second spectral noise of the position sensor in the second scan direction;
   modeling a first and a second noise spectral characteristic of the acquired first and second spectral noise behavior of the position sensor;
   wherein for the auxiliary scan and the main scan,
      the first feedback loop is further adapted to control the spatial positioning of the positioner in the first scan direction further using the first sensor noise spectral characteristic; and
      the second feedback loop is further adapted to control the spatial positioning of the positioner in the second scan direction further using the second sensor noise spectral characteristic.

18. The method according to claim 17, further comprising:
   determining a first and a second vibration transfer function, wherein the first and second vibration transfer functions are modeling the acquired first and second vibration frequency responses, wherein the determination of the first and second resonance frequency ranges are determined using the first and second vibration transfer functions; and
   determining a deviation function, wherein the deviation function is modeling the acquired deviation, wherein second feedback loop is adapted to perform the deviation correction in the second scan direction using the deviation function.

19. The method according to claim 18, wherein the method is performed utilizing a resonant controller.

20. The method according to claim 19, further comprising controlling a writing of servo patterns to a substrate, wherein the scanner is adapted to perform the writing of the servo patterns.

21. The method according to claim 20, further comprising:
   controlling a further auxiliary scan for a further preset spatial position;
   acquiring a further deviation of the positioner in the second scan direction from the further preset spatial position; and
   controlling a further main scan, wherein the second feedback loop is further adapted for controlling the spatial positioning of the positioner in the second scan direction essentially in the second frequency range and wherein the second feedback loop is further adapted to perform the deviation correction in the second scan direction using the further acquired deviation.

22. The method according to claim 21, wherein the method is performed by a controller of a scanner.

23. The method according to claim 22, wherein the positioner of the scanner further comprises a probe, wherein the positioner is adapted for moving the probe.

24. The method according to claim 23, wherein the positioner further comprises a substrate, wherein the positioner is adapted for moving the substrate.

25. The method according to claim 24, wherein the probe is adapted for writing of servo patterns to the substrate, wherein the servo patterns are indentations.

26. The method according to claim 25, wherein the scanner comprises a micro-scanner.

27. The method according to claim 26, wherein the scanner is utilized in a data storage device.

28. The method according to claim 26, wherein the scanner is utilized in a scanning probe microscope.

29. A computer-readable device comprising computer executable instructions for performing the method steps:
   determining a first and second vibration resonance frequency range of a positioner, wherein the first and second ranges comprise a first and a second vibration resonance of the positioner, respectively; and
   performing a main scan by a movement of the positioner in a first and a second scan direction, wherein the spatial positioning of the positioner in the first and second scan direction is controlled by a first and second feedback loop, respectively, wherein the controlling by the first and second feedback loop is essentially performed in the first and second resonance frequency range, respectively.

* * * * *